United States Patent [19]

Smith

[11] Patent Number: 5,112,074
[45] Date of Patent: May 12, 1992

[54] TOW BAR ASSEMBLY

[75] Inventor: Roger R. Smith, Imlay City, Mich.

[73] Assignee: The United States of America as represented by the Secretary of the Army, Washington, D.C.

[21] Appl. No.: 664,707

[22] Filed: Mar. 5, 1991

Related U.S. Application Data

[63] Continuation-in-part of Ser. No. 431,279, Nov. 3, 1989, abandoned.

[51] Int. Cl.⁵ .............................................. B60D 1/14
[52] U.S. Cl. ................................. 280/483; 280/491.5; 280/493; 156/187
[58] Field of Search ............. 280/483, 485, 486, 491.2, 280/491.5, 493, 494, 514, 515, 416.1, 472, 478.1, 480; 428/614; 423/448; 294/74; 267/148, 149; 156/172, 173, 187; 213/79, 82, 92, 178

[56] References Cited

U.S. PATENT DOCUMENTS

| | | | |
|---|---|---|---|
| 532,275 | 1/1895 | Inderlied | 213/178 |
| 1,024,675 | 4/1912 | Buckwalter | 280/514 |
| 1,353,094 | 9/1920 | Trumpour | 280/494 |
| 1,375,775 | 4/1921 | Burner | 280/491.4 |
| 2,238,095 | 4/1941 | Almcrantz | 280/483 |
| 2,726,097 | 12/1955 | Darrough | 280/483 |
| 3,492,022 | 1/1970 | Hansen | 280/491.5 |
| 4,214,932 | 7/1980 | Van Auken | 156/187 |
| 4,374,593 | 2/1983 | Smith et al. | 280/493 |
| 4,729,576 | 3/1988 | Roach | 280/292 |
| 4,851,065 | 7/1989 | Curtz | 156/173 |

FOREIGN PATENT DOCUMENTS

| | | | |
|---|---|---|---|
| 0596666 | 4/1934 | Fed. Rep. of Germany | 213/82 |
| 0877775 | 4/1953 | Fed. Rep. of Germany | 213/82 |
| 1454804 | 10/1966 | France | 280/483 |
| 0325783 | 7/1970 | Sweden | 280/493 |

Primary Examiner—Charles A. Marmor
Assistant Examiner—Anne Boehler
Attorney, Agent, or Firm—Peter A. Taucher; Gail S. Soderling

[57] ABSTRACT

An improved tow bar assembly and attaching system for use of heavy vehicles weighing in excess of 50 tons. The invention reduces shock to the two bar assembly though a hook and loop attaching means between the tow bar and the towed vehicle. Reinforcing composite windings about the midpoint of the tow bar reduce the overall weight of the tow bar while increasing strength and rigidity in critical areas.

5 Claims, 3 Drawing Sheets

TOW BAR ASSEMBLY

GOVERNMENT INTEREST

The invention described herein may be manufactured, used, and licensed by or for the Government for governmental purposes without payment to me of any royalty thereon.

CROSS REFERENCE TO RELATED APPLICATION

This application is a continuation-in-part of U.S. patent application Ser. No. 07/431,279, filed Nov. 3, 1989, now abandoned.

BACKGROUND AND SUMMARY

The invention relates to an improved tow bar assembly and attaching system where the individual tow bars are arranged in a V-configuration between the towing vehicle and the disabled vehicle. The invention allows the tow bars to be connected to the disabled vehicles without the need of a clevis. The improved tow bar better resists the compression and shock forces of towing and therefore can be made of lighter materials. The improved tow bar assembly is particularly useful for heavy vehicles weighing over 50 tons, but may be used for all-wheeled or tracked vehicles.

Prior art devices such as the invention described in U.S. Pat. No. 4,374,593, issued Feb. 22, 1983 to Roger R. Smith and James L. Celentino, show a two piece tow bar assembly with special end connectors that hook around a single towing pintle. The two piece design permitted interchangeable use of various tow bars and made mounting the tow bar a much easier process because each tow bar was only half the weight of earlier designs. One person could unload and mount the tow bar to a disabled vehicle unassisted.

The prior art device made use of a three piece vertical hook mechanism for attaching the rear of the tow bar to the disabled vehicle. A specialized eye connector was designed to fit the standard hook on the disabled vehicle. The hook could pivot vertically with respect to the eye member. An elongated loop attached to the rear of each tow bar engaged the hook. One problem with the prior art hook and loop attachment method is binding between the hook and loop when the towing and disabled vehicles turn, roll or pitch. The binding occurs because the pivoting points on the disabled vehicle are perpendicular to the vehicle's axis while the tow bars are angled at approximately 25° from center. The result of this configuration is binding during towing and greater stress on these crucial pivoting points.

A second problem of the hook and loop fastening method is the play in the attaching means. The loop configuration allows the hook to travel in and out approximately 2 inches until it hits the ends of the loop. This travel occurs whenever the towing vehicle stops, starts or encounters a bump. When towing heavy vehicles, this travel imparts an enormous shock on the attaching points at each occurrence and can result in a premature failure of the tow bar.

Tow bar failures usually manifest themselves either by failure at the attaching points or at the center of the tow bar. Because bending forces concentrate at the midpoint of the tow bar bending of the bar can result in a column failure. By reinforcing this area of the tow bar with a composite winding, the tow bar can be made of a lighter material which eases installation and removal.

The major object of my invention is to provide for an improved attaching means for attaching the tow bar to the disabled vehicle. The improved connection geometry allows the tow bar to swing freely about an axis perpendicular to the front plane of the disabled vehicle without binding. A further object of my invention is to eliminate the travel in the attaching points and to absorb any shock by means of two springs attaching the towing pintle to the towing vehicle. A final object of the invention is to strengthen the tow bar in the critical central area by use of alternating composite windings.

DETAILED DESCRIPTION OF THE DRAWINGS

Figure 1:
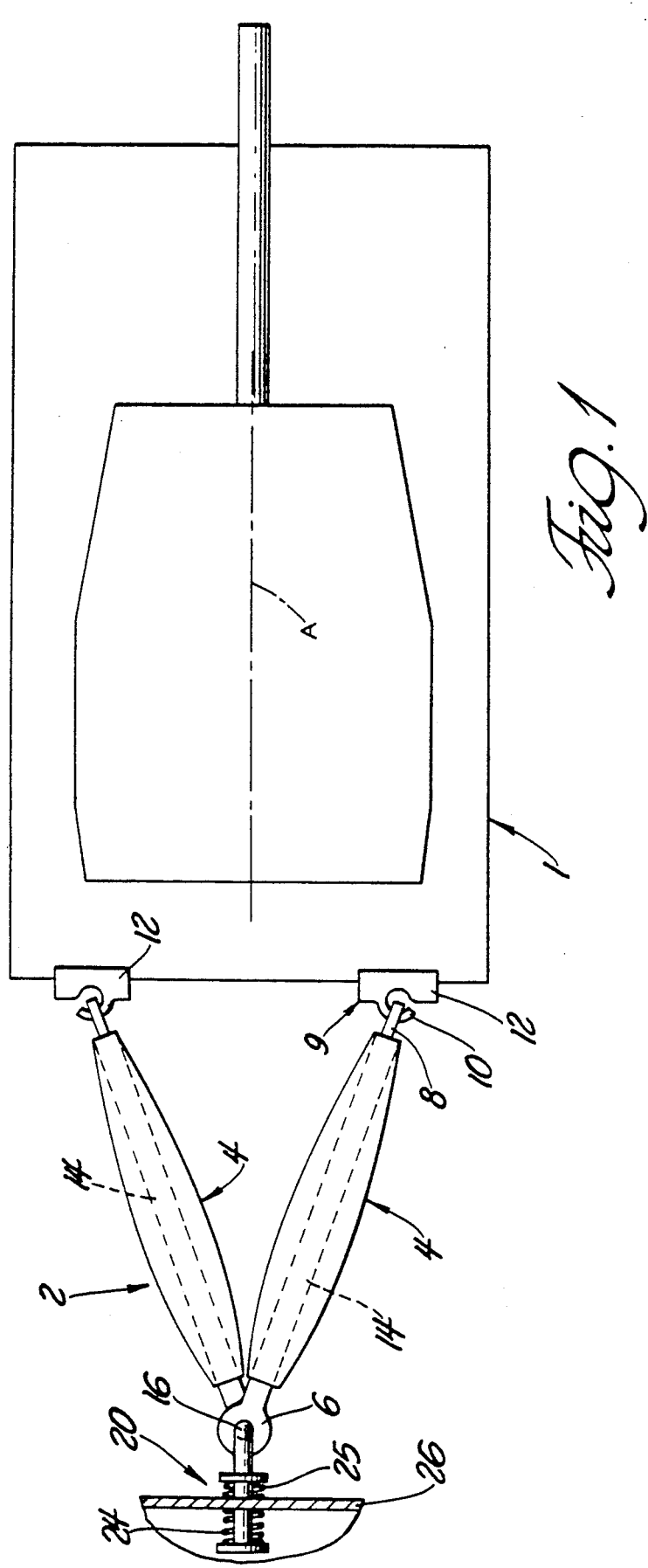
FIG. 1 is a plane view of the towing mechanism attached to a main battle tank.
Figure 2:
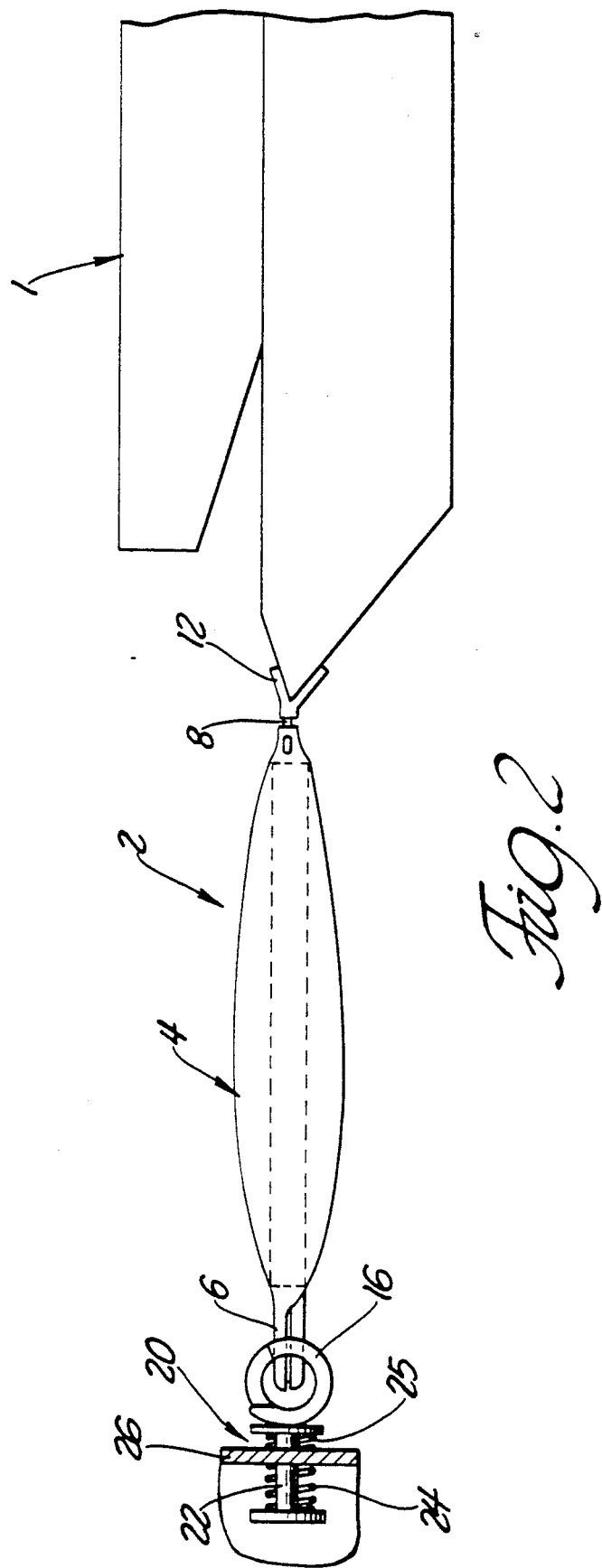
FIG. 2 is a horizontal view of the towing mechanism of FIG. 1.

FIGS. 1 and 2 show a towing mechanism 2 attached to a disabled vehicle. The towing mechanism may be used to tow any type of vehicle but is particularly useful for towing heavy vehicles weighing over 50 tons such as a main battle tank. The towing vehicle (not shown) can be a specially designed recovery vehicle, or any vehicle with approximately the same weight as the towed vehicle and suitably equipped with a towing pintle 16. The towing mechanism comprises three basic parts; an attaching mechanism 9 mounted on the towed vehicle 1; towing pintle 16 mounted to the towing vehicle (not shown); and two identical tow bars 4.

As shown in FIG. 1, the attaching mechanism comprises a novel hook and loop attaching means which is believed to significantly reduce damage to the towing mechanism while operating over rugged terrain. Towing brackets 12 are mounted equidistant from the vehicle's central axis A. The distance between brackets 12 being approximately three-fifths the width of the towed vehicle 1. As shown in FIG. 2, the towing brackets 12 are mounted on the extreme edge of towed vehicle 1. For tanks, this extreme edge is where the upper and lower glacis plates meet.

Each towing bracket 12 includes a circular hook 10. Hook 10 is attached to the towing vehicle so that the plane of the hook 10 is parallel with the ground when the towed vehicle is at rest on a flat surface. The openings of hooks 10 face the outer edge of disabled vehicle 1. By mounting the towing bracket 12 on the extreme edge of the tank, the towing mechanism 2 has an uninterrupted swing (pitch) along the extreme edge of the disabled vehicle. Thus, the towing mechanism 2 swings without binding as the disabled vehicle 1 travels up and down hills.

Towing pintle 16 is attached to the towing vehicle so that the plane of pintle 16 is perpendicular to the ground when the towing vehicle is at rest on a flat surface. Towing pintle 16 is of a conventional design and is currently used on U.S. Army vehicles such as the M-60 and M1A1 Main Battle Tanks. To reduce the shock applied to the towing mechanism 2, pintle 16 is attached to the towing vehicle by means of a damper 20. Damper 20 maybe constructed using either a hydraulic or a mechanical means damping means. As illustrated in FIG. 2, the damper 20 is made from a rod 22 and springs 24 and 25. Towing pintle 16 is a U-shaped member attached to a rod 22. Attaching bracket 26 is securely mounted to the towing vehicle. Rod 22 is swivel mounted in a circular opening of bracket 26. Inner spring 24 surrounds rod 22 on the inside of bracket 26 and outer spring 25 surrounds rod 22 on the outside of bracket 26.

As the towing vehicle accelerates, inner spring 24 is compressed to absorb the inertia of moving the towed vehicle 1. Inner spring 24 is designed to be a stiffer and stronger spring than outer spring 25 because it is anticipated to be under a compression load while towing a vehicle. During braking, outer spring 25 absorbs the shock of slowing the towed vehicle. Springs 24 and 25 act in concert to absorb the shock to the towing mechanism 2 as the towing and towed vehicles traverse rough terrain. Damper 20 reduces the stress on the towing mechanism 2 by absorbing and damping transient shock loads on the towing bracket 12.

Figure 3:
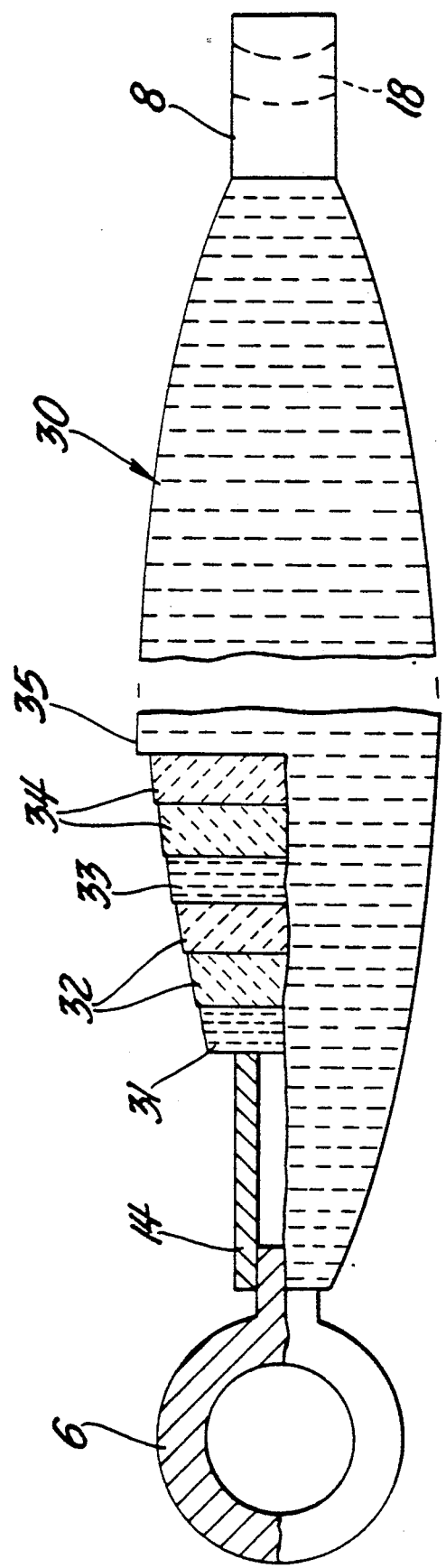
FIG. 3 is a sectional vie of an individual tow bar showing the alternating composite windings.

Referring especially to FIG. 3 the tow bars 4 are made from an elongated solid rod or hollow tube 14. An eye member 6 is attached to the front end of each tube 14. Eye members 6 are individually shaped as one-half a toroid with one flat surface so that two eye members form a horizontal toroid when overlaid on towing pintle 16 with their flat surfaces in contact. Attached to the rear end of tube 14 is vertical eye member 8. Eye member 8 attaches to hooks 10 to connect the tow bar to the disabled vehicle. As shown in FIG. 3, eye member 8 has an opening 18 having a toroidal interior surface sized to swingably engage hook 10. the toroidal opening 18 would be formed into eye member 8 when the part is made.

Tow bars 4 are made from a light weight tube or rod 14. Tow bars 4 are reinforced about their midpoints with a reinforcement 30 of a composite material such as graphite, ceramic or glass fibers consolidated by a resinous material. Reinforcement 30 will be formed so the reinforcing fibers are approximately twice as thick about the midpoint of tow bar 4 as they are near the ends of the tow bar. This will provide sufficient reinforcement for normal construction. However, if the tow bars are to be made of thinner material or made longer than normal length, the reinforcement 30 should be ajusted and made three or four times as thick in the middle as it is near the ends to provide additional strength against column failure. The reinforcement 30 is made from a series of layers of separate windings of a composite fiber. A first winding 31 is shown as a spiral winding wrapped about the tube at a 90° angle to the tow bar axis. A second winding 32 could be formed of alternating helical windings each approximately perpendicular to one another and at a 45° angle to the tow bar axis. A third winding 33 is again laid as a spiral to the tow bar axis and acts to prevent reinforcement 30 from being radially displaced by compression load. A fourth winding 34 is again made up of alternating helical windings, each approximately perpendicular to one another. Winding 34 is opposite in orientation of winding 32. A fifth winding 35 is a final spiral winding about the tow bar axis. The fifth winding 35 also acts to prevent reinforcement 30 from being radially displaced by compression loads. The various layers or windings serve to strengthen the tow bar and prevent bending when the tow bar is subjected to compression or bending moments.

The composite reinforcement 30 thickness is greatest at the midpoint of the tow bar, since that is the point of greatest bending moment; and is designed to prevent column failure when the tow bar is under stress from compression. It is believed that compression forces are the greatest causes of failures of heavy duty tow bars. These forces are greatest at the midpoint of the tow bar. By using a composite reinforcement 30 to specifically reinforce the critical midpoint area, tube 14 can be made from a much thinner and lighter material greatly facilitating handling and installation of the tow bars.

OPERATION AND USE

The towing vehicle is first positioned with its towing pintle 16 facing the towing bracket 12 of the disabled vehicle. The towing vehicle is spaced so that the towing pintle is slightly less then the length of a tow bar from the disabled vehicle and roughly equidistant from each towing bracket. Because the tow bars 4 are interchangeable, they maybe installed on either the left or right side of the vehicle. The first tow bar should be positioned so that the flat side of eye member 6 is facing upward. Tow bar 4 if first installed on the disabled vehicle by aligning the tow bar at a 45° angle to the vehicle's axis A. Eye member 8 is placed in the opening between hook 10 and bracket 12. Tow bar 4 is swung approximately 90° onto hook 10. Eye member 6 is placed on towing pintle 16. The other tow bar 4 is aligned so the flat portion of eye member 6 is facing downward. It is similarly aligned at a 45° angle away from the vehicle's axis and eye member 8 is swung onto hook 10. Eye member 6 is placed on towing pintle 16, atop the flat portion of eye member 6 of the first tow bar.

Towing mechanism 2 attaches to a disabled vehicle by means of a simple hook and eye member arrangement. There are no moving parts such as a clevis to bind or break in the combat environment the invention is contemplated for. The horizontal placement of hooks 10 allows the towing and towed vehicles to pitch freely about the attaching mechanism 9 without binding or pinching. This free travel is possible even as the disabled vehicle traverses rough terrain. By attaching the mounting brackets 12 at the far edge of the towed vehicle, greater pitch about the attaching mechanism is permitted than in previous designs.

The fit between hook 10 and toroidal opening 18 of eye member 8 is close enough so there is little or no slack between the eye member and hook as the vehicle accelerates or decelerates. All pushing and pulling forces are transmitted directly through the tow bar to the shock damper 20. The close fit within the attaching mechanism is believed to significantly reduce failures at this critical junction due to the stress of shock loading.

Reinforcing the midpoint of the tow bar with a composite reinforcement 30 further reduces failures of the towing mechanism by reinforcing a critical area. Examination of tow bar failures showed that they generally break at the midpoint of due to column failure. The stress on the tow bars is greatest when the towing vehicle is turning. If the towing vehicle is turning right, the right tow bar is undergoing compression and the left tow bar is undergoing tension. Column failure usually occurs on the tow bar undergoing compression.

Under adverse conditions as are often found in a military setting, the lighter weight of my invention eases mounting and unmounting the tow bars on a disabled vehicle. The simplified hook and eye member attaching system is believed to further speed attachment of the tow bars to the disabled vehicle because the hooks need not be aligned and no closure or locking means is required to secure the tow bar to the mounting bracket.

I wish it to be understood that I do not desire to be limited to the exact details of construction shown and described for obvious modifications will occur to a person skilled in the art.

I claim:

1. A towing mechanism comprising;
   a. two circular hook members mounted horizontally on a disabled vehicle, said hook members being spaced equidistant from the disabled vehicle's center line;
   b. two identical tow bars;
   c. each of said tow bars comprising an elongated tube, a front eye member affixed to one end of the tube and a rear eye member affixed to the end of the tube opposite the front eye member, said rear eye member being perpendicularly oriented relative to said front eye member;
   d. said front eye member of each identical tow bars having a circular opening sized to fit over a common pintle of a towing vehicle;
   e. said rear eye member of each identical tow bar comprising a flat plate having a portion attached to said elongated tube, and a portion located outside the tube; said outside portion having a partial toroidal opening sized to fit around one of said circular hooks each rear eye member fitting on a separate circular hook whereby said tow bar may freely swing onto said hook members.

2. The towing mechanism of claim 1 wherein the hook members are attached to a glacis plates mounted on the disabled vehicle.

3. The towing mechanism of claim 1 further comprising a shock dampening mechanism between the towing vehicle and the pintle.

4. The towing mechanism of claim 3 wherein the shock dampening mechanism further comprises a rod attached to the pintle; a plate attached to the towing vehicle having a hole through which the rod extends; two stop means fastened to the rod; first and second coil springs surrounding the rod between the stop means, the first spring on the outside of the plate and the second spring on the inside of the plate.

5. The towing mechanism of claim 4 wherein the second spring has a greater force constant than the first spring.

* * * * *